United States Patent [19]
Latham, Jr.

[11] 3,749,285
[45] July 31, 1973

[54] PROGRAMMED LIQUID DELIVERY SYSTEM

[75] Inventor: Allen Latham, Jr., Jamaica Plain, Mass.

[73] Assignee: Haemonetics Corporation, Natick, Mass.

[22] Filed: Sept. 13, 1971

[21] Appl. No.: 179,869

[52] U.S. Cl. .................................. 222/58, 222/214
[51] Int. Cl. ............................................. G01f 1/04
[58] Field of Search ..................... 177/225; 222/58, 222/214; 128/214 E, 214 F, DIG. 13

[56] References Cited
UNITED STATES PATENTS

| | | | |
|---|---|---|---|
| 3,105,490 | 10/1963 | Schoenfeld | 128/DIG. 13 |
| 3,384,080 | 5/1968 | Muller | 222/214 X |
| 3,404,809 | 10/1968 | Harris et al. | 222/17 |
| 3,425,415 | 2/1969 | Gordon et al. | 222/58 X |

*Primary Examiner*—Stanley H. Tollberg
*Attorney*—Bessie A. Lepper

[57] ABSTRACT

Fluid dispensing program method and apparatus designed to be preset to deliver a predetermined weight of one or more liquids in sequence. When the exact preset weight of liquid is delivered from any one liquid reservoir a sensing means is triggered by the upward motion of a weighing means responsive to a decrease in weight from which the reservoir is suspended. The sensing means directs a signal to a stepping switch which effects a closing off of liquid flow and the actuation of the next step in the protocol being followed. Rates of liquid flow may be controlled if desired. The system is particularly suitable for controlling amounts of different liquids to a centrifuge during deglycerolization of red blood cells.

10 Claims, 13 Drawing Figures

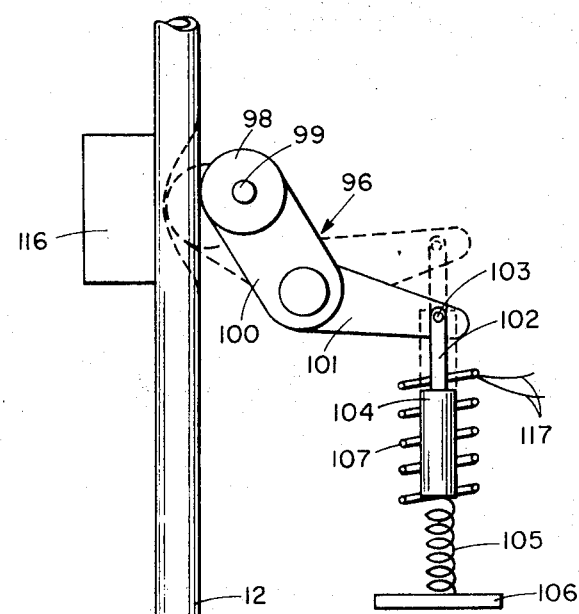
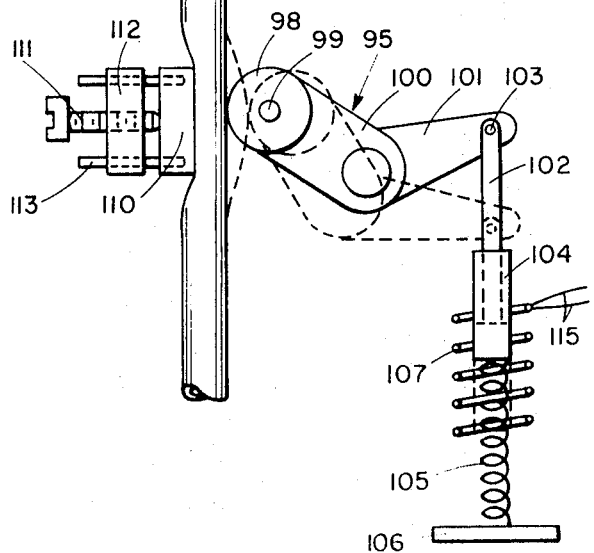
Fig. 8
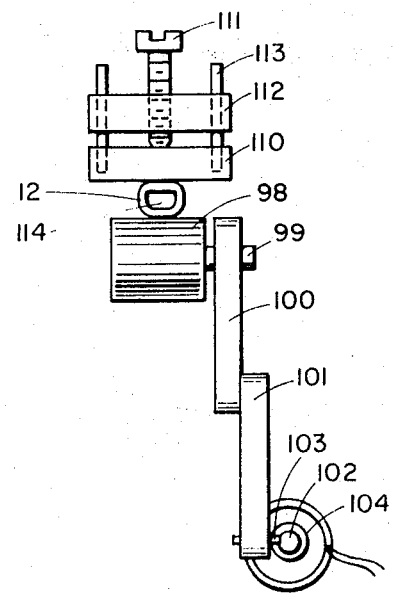
Fig. 9
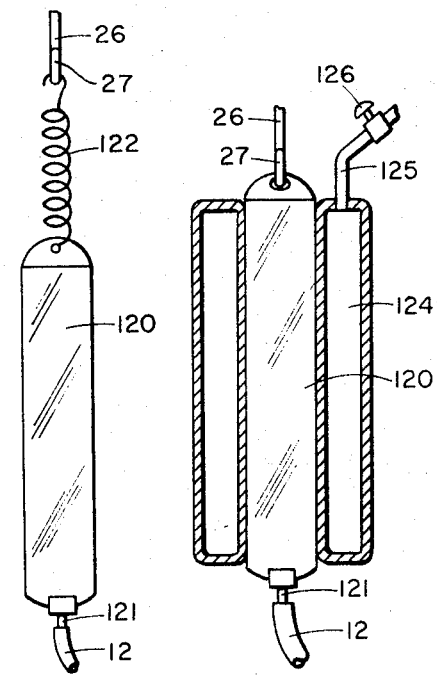
Fig. 10   Fig. 11

PROGRAMMED LIQUID DELIVERY SYSTEM

This invention relates to a liquid dispensing program method and apparatus and more particularly to a system for step-by-step control of the withdrawal of liquids from a series of separate reservoirs.

It is sometimes necessary to furnish means to provide a number of different liquids successively in different predetermined quantities for effecting the treatment of something or effecting the reaction between two or more reactants. Under such a system of control, a weighed amount of liquid must be withdrawn from one reservoir before automatically progressing to the withdrawal of a weighed amount of liquid from the next reservoir, and so on. Between liquid withdrawals it may be necessary automatically to initiate and stop other procedural steps which are to act upon the material being treated or reacted. For example, it may be necessary to perform mixing, heating, etc., between liquid additions. Such a liquid withdrawal control system should be relatively simple to operate and easy to reset with respect to the weight of liquid to be withdrawn from each liquid reservoir. It should also be flexible with respect to the incorporation of automatically actuated procedural steps.

As an example, the deglycerolization of red blood cells being retrieved from frozen storage by the Meryman Salt Solution Protocol may be cited. In this protocol a given amount, dependent upon the weight of red blood cells, of a 1.6 percent sodium chloride solution is first perfused through the cells and then an 0.9 percent solution of sodium chloride is used. It may also be desirable to provide for a change in flow rate at the time of shifting from the 1.6 percent to the 0.9 percent solution, a situation which indicates the need for suitable signals to initiate automatically the succeeding steps in the protocol. The solutions used in such a protocol typically come in containers which vary in weight from container to container. It is therefore desirable to have a liquid dispensing program system which can generate a signal based on the weight of solution used rather than on the remaining weight of the container. Such a signal should be suitable for actuating the pumping of the next liquid or initiating the next step in the procedure. Since the amounts of liquids used will depend upon the weight of the cells being treated, the liquid dispensing system should be one which is readily reset for each liquid.

Although the example given above and the description presented below are concerned with the treatment of red blood cells, it is to be understood that the method and apparatus of this invention are applicable to any liquid dispensing program wherein specific quantities of different liquids are to be dispensed in a predetermined sequence or where specific quantities of the same or different liquids are to be dispensed between the performance of procedural steps such as mixing, heating, settling and the like. Thus the method and apparatus of this invention may be used in a chemical synthesis protocol, for example.

It is therefore a primary object of this invention to provide a liquid dispensing program system capable of automatically delivering specific, predetermined quantities of liquids in sequence. It is another object to provide a system of the character described in which the quantity of each liquid is easily reset for a new program and in which the rates of liquid flow may be varied. Still another object is to provide a liquid delivery system which may be integrated into a protocol which includes steps other than the delivery of liquids. It is an additional object of this invention to provide such apparatus which is particularly suited for processing blood components with a series of liquids.

It is another primary object of this invention to provide a novel method for automatically delivering predetermined quantities of liquid in a sequential program and at predetermined flow rates. A further object is the provision of such a method which permits the incorporation of the automatic performance of procedural steps integrated into the liquid delivery protocol. Other objects of the invention will in part be obvious and will in part be apparent hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which FIG. 1 is a front view of the weight sensing mechanism of the invention with the front cover plate removed;

FIG. 8 is a side view of a dual-system automated clamp mechanism suitable for controlling the flow of liquid in the system;

FIG. 9 is a top plan view of the lower clamp mechanism of FIG. 8;

FIG. 10 illustrates the use of a spring in conjunction with an elongated plastic reservoir to control liquid flow rate;

FIG. 11 shows the use of a pneumatically-actuated press mechanism with a plastic reservoir to control flow rate;

In the fluid dispensing system of this invention, the individual reservoirs containing the liquids to be dispensed are suspended on separate weight-sensing apparatus which actuate an electrical circuit when the predetermined weight of liquid is discharged from the reservoir. The electrical signal thus generated by the electrical circuit is used to actuate a stepping switch which, for each new step, provides the appropriate electrical circuitry for stopping the withdrawal of liquid from one container and proceeding with the withdrawal of liquid from the next container. The flow rates of liquid withdrawal from glass containers may be determined either with controlled pumps or by hydrostatic heads, which may, if desired, be provided with automatic height control, and appropriately proportioned tubulations. The flow rates of liquids withdrawn from plastic containers may additionally be controlled by controlling the position of the containers or by a pneumatically-actuated press. The starting and stopping of other procedural steps may be incorporated into the electrical circuitry of the stepping switch.

Figure 1:
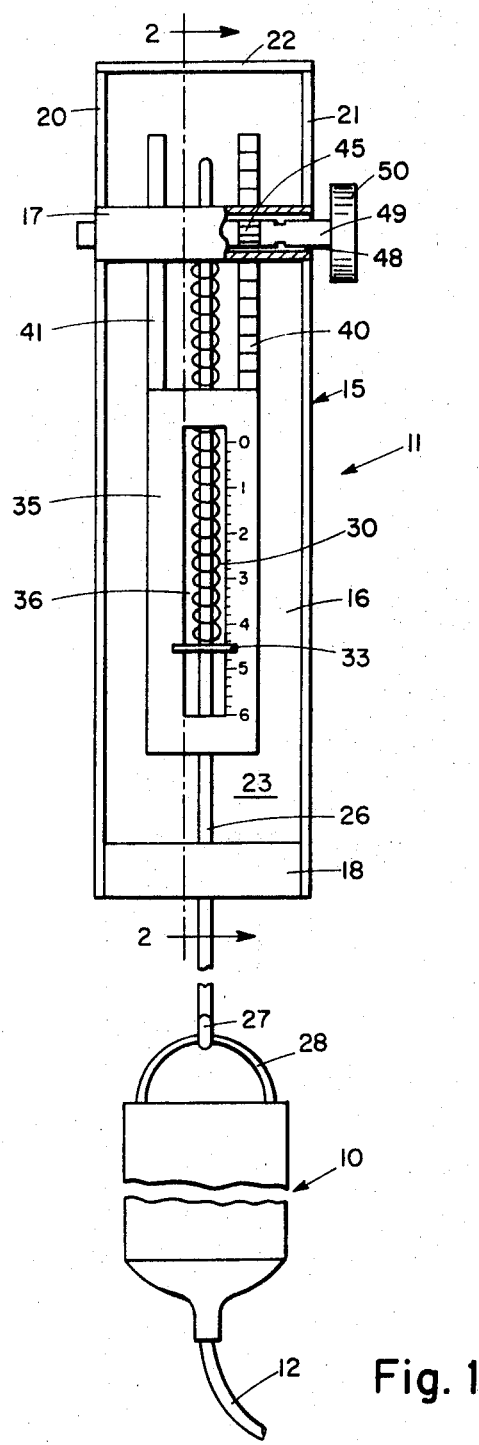
Figure 2:
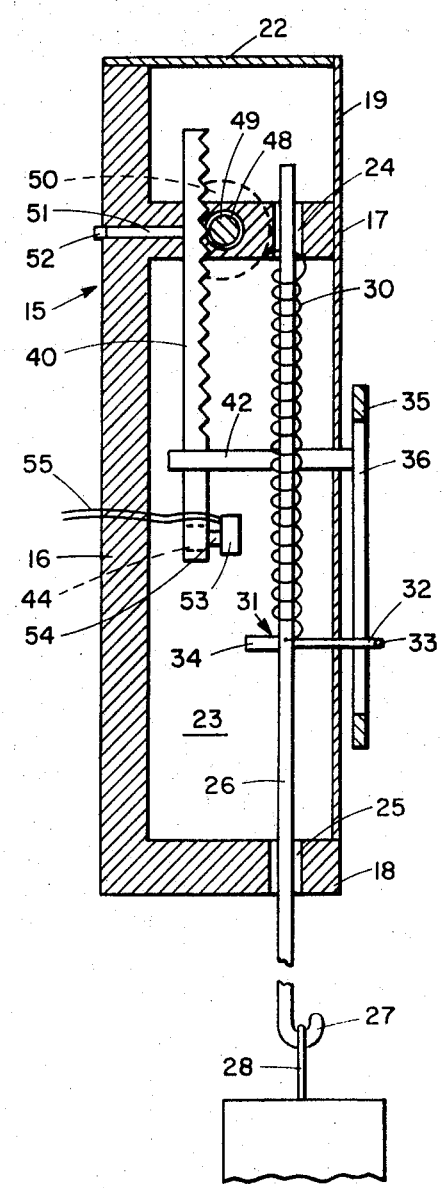
FIG. 2 is a cross section of the weight sensing mechanism of FIG. 1 taken along plane 2—2 of FIG. 1 showing a reed switch for initiation of a signal when the weight is reduced to a preset point.

A suitable weight-sensing apparatus capable of producing the desired electrical signal to the stepping switch is illustrated in FIGS. 1 and 2 wherein like reference numerals are used to refer to like apparatus components. The liquid container 10 is suspended in a free state from the weight-sensing assembly 11. The container 10 is connected on its lower end by means of flexible tubing 12 to suitable liquid flow control means to be described in connection with FIGS. 6-11. The flexible tubing 12 is preferable of such a length as to provide an ample loop between container 11 and the liquid flow control means so that the only effective force operating on the weight-sensing assembly 11 is the actual weight of the container 10 and its liquid contents.

The weight-sensing assembly is formed of a frame 15 having a vertical member 16, an upper horizontal support member 17 and a lower horizontal member 18. A front plate 19, two side plates 20 and 21 and a cover plate 22, along with frame 15, provide housing, defining therein a chamber 23 in which the components making up the weight-sensing mechanism are located. The upper horizontal support member 17 and lower horizontal member 18 have in-line openings 24 and 25 drilled through them to permit free movement of a rod 26 through them and within the confines of chamber 23. Rod 26 is equipped at its lower end with means to support reservoir 10. Thus in the embodiment of FIGS. 1 and 2, rod 26 has a hook 27 suitable for engagement with a bail 28 of reservoir 10.

The rod 26 is supported for vertical movement by an accurately mounted tension spring 30 which surrounds rod 26 and which is anchored at its upper end to the underside of horizontal support member 17 of the frame and at its lower end to rod 26. Thus the spring, through its attachment to rod 26, is responsive to the weight of the container 10 and its contents and serves as a means of controlling the vertical movement of rod 26. Attached to rod 26, preferably at the point where spring 30 is anchored, is a liquid weight indicator means 31 which comprises a forwardly extending finger 32 to which a thin horizontally oriented line pointer member 33 is attahced. A rearwardly extending magnet 34 serving as an actuator for the sensing mechanism is affixed to rod 26 at the level of the indicator means.

A calibrated movable scale 35, having a slot 36 which permits free movement of finger 32 in it and free motion of the line pointer 33 in front of the calibrations, is rigidly mounted to a rack 40 and a guide rod 41 through a pair of support bars, one of which is shown as bar 42 in FIG. 2. The lower ends of rack 40 and rod 41 are connected by a cross bar 44 and rack 40 is adapted to engage a pinion 45 rotatable in a passage 48 drilled through the upper horizontal support member 17 of the frame. The pinion 45 is mounted on a suitable shaft 49 which has bearings (not shown) associated with each end to support it and permit the hand turning of pinion 45 by means of a knob 50 affixed to shaft 49. The shaft 49 is locked in position by a drag in the form of a plastic slug 51 positioned against the shaft with a set screw 52.

Cross bar 44 has a reed switch 53 attached to it through a short pin or screw 54 which makes it possible to align reed switch 53 so that as the magnet 34 is raised with removal of liquid from container 10, the magnet will reach the reed switch to exert a magnetic force on it and complete a signal circuit by way of lead wires 55. Thus the combination of magnet 34 and reed switch 53 make up a weight sensing means, the magnet serving as the weight sensing switch actuator means and the reed switch as the weight sensing switch means.

In operation, the liquid container is suspended on rod 26, and the scale 36 is moved by turning knob 50 to bring the scale to a position relative to the position of the line pointer representing the amount of liquid to be delivered. Thus, assuming that the scale is calibrated in grams and it is desired to deliver 300 grams of liquid from the container, the scale is moved so that the line pointer is over the 300-gram line on the scale. The scale may also be calibrated directly in units of red cell weight to be processed, thus eliminating any calculations to determine weight of liquid required to treat a given weight of cells.

Discharge of the liquid through tubing 12 is then begun. When the desired amount of liquid is discharged the scale will read zero and magnet 34 will have been pulled upwardly by action of spring 30 to the point where it actuates reed switch 53 to send a signal via lead wires 55 to a stepping switch which in turn is connected to appropriate circuitry to disengage a pump, or other liquid flow control means with which tubing 12 is associated. The flow of liquid from reservoir 10 is immediately cut off and the next step in the protocol is simultaneously initiated through circuitry in the stepping switch.

It will, of course, be apparent to those skilled in the art that the rack-and-pinion arngement shown in FIGS. 1 and 2 are exemplary of but one means which may be used to set the position of the movable scale 35 and that a number of other well-known mechanism may be used in place of the rack and pinion. One of the primary characteristics which must be possessed by the scale setting means is that it must remain in a position once it is set. Among other types of mechanisms which may be used are servo devices and electrically, hydraulically and pneumatically-operated mechanisms. It is also of course possible to substitute other weighing means such as a lever arm in place of spring 30 and to use other types of pointing means such as a spot of light for the horizontal line pointer 33. The primary requirement for the weighing means is that it is responsive to a decrease in weight of the fluid reservoir freely suspended therefrom. Likewise the pointer means must be a mechanism which is movable an visible to the operator of the apparatus.

Figure 3:
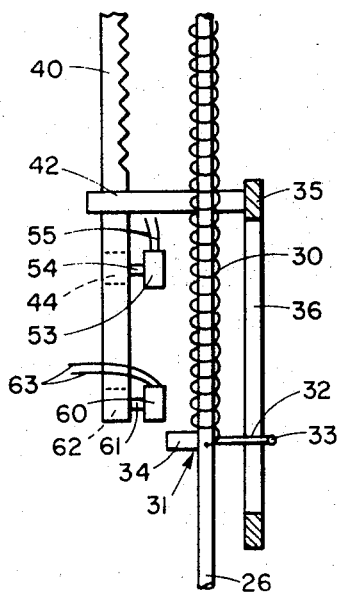
FIGS. 3, 4 and 5 illustrate other embodiments of the weight sensing mechanism including two reed switches, a mercury switch and an electrical contact wiper arm.
Figure 4:
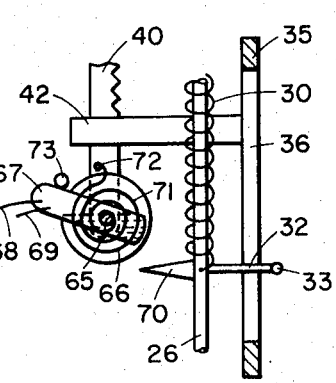
Figure 5:
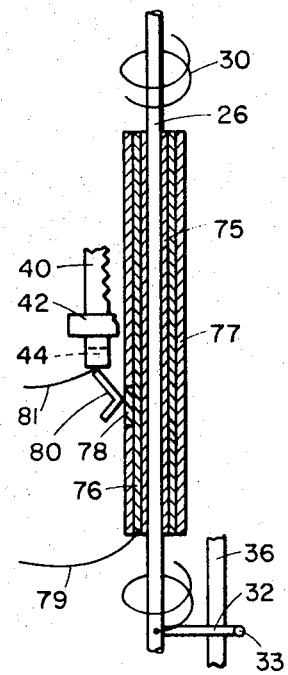

FIGS. 3, 4 and 5 illustrate modifications of the sensing mechanism. In these figures like reference numerals are used to identify like components in FIGS. 1 and 2. In the embodiment of FIG. 3 an additional lower reed switch 61, adjustably mounted through a screw 61 to a lower cross bar 62, is added to provide a first signal by way of lead wires 63 to effect some change in the protocol other than to stop the flow of liquid from the reservoir with which the weight-sensing mechanism is associated. As an example of the use of the lower reed switch, it may be connected to a suitable mechanism for changing the rate of liquid flow, such as that illustrated in FIG. 8 and described below.

FIG. 4 illustrates the use of a mercury switch in the sensing mechanism. A shaft 65 is mounted between rack 40 and guide rod 41 at their lower ends. Shaft 65 has a small rubber-tired wheel 66 mounted on it for rotation. The wheel 66, in turn, has a mercury switch 67 affixed thereto and positioned so that it will normally be in an off position, i.e., the mercury level will be below that which would be necessary to provide an electrical contact between lead wires 68 and 69. Such contact may, however, be made by rotating wheel 66 and the mercury switch 67 through a few degrees of arc. This rotation is effected by contact of finger 70, attached to rod 26, with the rubber-tired wheel; and such contact in turn is made when sufficient liquid has been withdrawn from container 10 to permit tension spring 30 to contract to a point where tripper finger 70 strikes wheel 66. Hair spring 71 terminating in pin 72 serves to hold mercury switch 67 in the off position against stop pin 73 except when finger 70 rotates wheel 66.

In the embodiment of the sensing mechanism shown in FIG. 5, a direct electrical connection is made. A section of rod 26 is insulated by a tightly fitting inner thin sleeve 75 of a dielectric material over which is fitted a thin intermediate sleeve of an electrical conductor 76 over which is fitted an outer thin sleeve 77 of a dielectric material. The outer sleeve 77 has a metal plug 78 which makes electrical contact with the intermediate sleeve 76 which is, in turn, connected into an electric circuit through lead wire 79. An electrically conductive wiper arm 80 is mounted in cross bar 44 and is shaped and positioned to make continuous contact with the outer surface of outer dielectric sleeve 77 or with the surface of plug 78. The wiper arm 80 is connected through lead wire 81 into the same circuit as the intermediate electrically conducting sleeve. When the wiper arm makes contact with the plug 78 the circuit is closed and an appropriate signal is generated.

Figure 6:
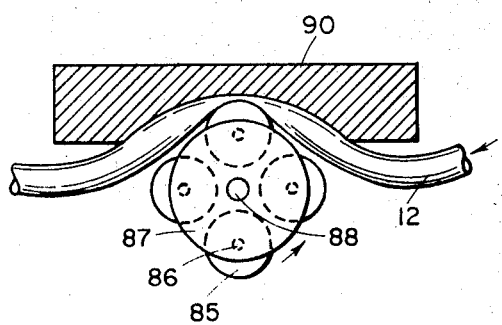
FIGS. 6 and 7 are cross sectional views of a roller pump suitable for use in the liquid dispensing program system of this invention.
Figure 7:
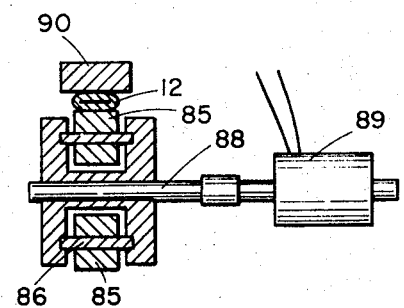

The means for controlling the flow of liquid within any one of the flexible tubings may take one of several forms. As a first example, a roller pump such as shown in FIGS. 6 and 7 may be used. Pumps such as this are known (see for example U.S. Pat. No. 3,565,286 which discloses a pumping and programming apparatus for continuously varying the rate and composition of a liquid mixture) and therefore need not be described in detail except to show how they are actuated in the dispensing system of this invention. In the roller pump of FIGS. 6 and 7 a series of rollers 85 are mounted for rotation on axes 86 supported in suitable bearings (not shown) in a pump rotor 87. The pump rotor in turn is affixed to a shaft 88 which in turn is coupled to a motor 89, the electric power to which is controlled through the stepping switch of FIGS. 12 and 13 as described below.

Within the roller pump, the flexible tubing 12 is alternately compressed and decompressed between rollers 85 and the surface of platen 90. Starting and stopping liquid flow is, of course, effected by starting motor 89. The rate of compressing and decompressing may be controlled by the rate at which motor 89 is operated, thereby serving as a means for regulating the rate of liquid flow. Generally, the liquid from the contaier will be fed to the pump by gravity, and the rate of pumping may also be adjusted by choice of tubing inside diameter in addition to choice of motor speed.

One or more automated pinch clamps may also be used as the means for controlling the flow of liquid within any one of the flexible tubings where the liquid is gravity fed. An exemplary form of such punch clamps is illustrated in FIGS. 8 and 9. The modification illustrated in FIGS. 8 and 9 is particularly suitable for use with the sensing means of FIG. 3 wherein two switches are provided, one being used to change the rate of liquid flow, the other being used to shut off flow. The automated pinch clamps 95 and 96 are shown in the form of overcenter pivot arm mechanisms. Taking the lower pinch clamp 95 as exemplary of the construction of these devices, it will be seen to comprise a pressure roller 98 mounted for rotation on a shaft 99 which in turn is supported by two arms 100 and 101 rigidly joined. Arm 101 is in turn pivotally connected to a vertical driving rod 102 through a pivot pin 103; and driving rod 102 is connected to a solenoid 104 which is affixed at its bottom end to a spring 105 anchored to a base plate 106. A suitable solenoid energizing coil 107 is provided for actuating the movement of the solenoid and hence of the overcenter pivot arm mechanism.

It is assumed in the embodiment of FIGS. 8 and 9 that the lower automated pinch clamp 95 is to be used to control the rate of liquid flow through tubing 12. Since this rate should be adjustable, a movable platen 110 is provided to contact a short length of tubing 12. The platen 110 is moved by means of an adjusting screw 111 which may be turned within a screw plate 112 rigidly mounted (by means not shown) with respect to the tubing 12. The platen 110 is aligned by means of several alignment pins 113 which slide within suitable openings through the screw plate 112. Movement of platen 110 by turning screw 111 determines the cross sectional area of the passage 114 within the tubing and hence provides a means for adjusting the flow rate of liquid through the tubing. It will be seen in FIG. 8 that when the pinch clamp is in the position illustrated by the solid lines, the rate of flow is less than maximum. Assume, for example, that it is desired to start the liquid flow at this less-than-maximum rate. The screw 111 will be turned to adjust the position of platen 110 to chieve this and the solenoid and spring will be chosen to position the overcenter pivot arm 95 in its upper position (solid lines) when no current is provided in coils 107. When the magnet 34 mounted on rod 26 reaches the lower reed switch 60 (FIG. 3) a suitable signal is generated and transmitted through circuitry not shown (see FIGS. 12 and 13) to provide for current to be delivered to coil 107 via lead wires 115. The solenoid 104 is energized, moves downwardly against the spring and pulls the overcenter pivot arm clamp 95 back to the position indicated by the dotted lines, thus allowing the tubing to be decompressed to whatever extent is desired. Decompression of the tubing increases the cross sectional area 114 of the tubing and hence the flow rate. It is, of course, equally possible to reverse the order by starting with the overcenter pivot arm clamp in its lower position and moving it upwardly, thus decreasing the rate of flow prior to the time it is cut off entirely.

The upper overcenter pivot arm clamp 96 is constructed in the same manner as clamp 95. The platen 116 is, however, fixed in position and the clamp is movable from the position of full-open (solid lines) to full-closed (dotted lines) by proper actuation of solenoid 104 through the supplying or not supplying of current to coils 107 by lead lines 117. Using the sensing means of FIG. 3, the reed switch 53 will be used to control clamp 96 to completely cut off the flow of liquid. It is, of course, possible to use clamp 96 with the single reed switch arrangement of FIG. 2, thus eliminating the flow-control feature incorporated in the use of automated clamp 95. Automated clamp 96 may also be used alone with the sensing and switch mechanisms of FIGS. 4 and 5.

Solutions for processing blood and its components, e.g., red cells, are now being supplied more and more in sealed flexible plastic containers which eliminate any need for venting, thereby eliminating the hazard of contamination by particle-laden room air entering the reservoir. Such plastic containers are often long and relatively narrow in size such as shown in FIG. 10. Typically such a container 120 may be as much as twelve inches in length while the upward movement of rod 26 on which it is suspended may be less than two inches. Thus as the plastic container is emptied the liquid level within it drops rapidly, decreasing the hydrostatic head on the liquid and thereby decreasing the rate of liquid delivery from the reservoir by way of the discharge tube connection 121 adapted for attachment to tubing 12. This decreasing in hydrostatic head brought about through the lowering of the liquid level may be counteracted by continuously raising the plastic container as the liquid is discharged by interposing a spring 122 between the container 120 and rod 26. By proper choice of spring 122 the hydrostatic head and flow rate may be maintained constant or they may be continually increased. FIG. 11 illustrates another means by which the rate of liquid flow from a plastic container 120 may be controlled. When the container is full an inflatable sleeve 124 is fit around it and compressed air is introduced by way of tubing 125 into the sleeve. When liquid is to be discharged a suitable constant pressure regulator valve 126, associated with tubing 125, is opened and left open. The pneumatic pressure within sleeve 124 continues to squeeze container 120, thus providing for a constant liquid flow therefrom. Other squeezing means may also be used with these plastic reservoirs.

Figure 12:
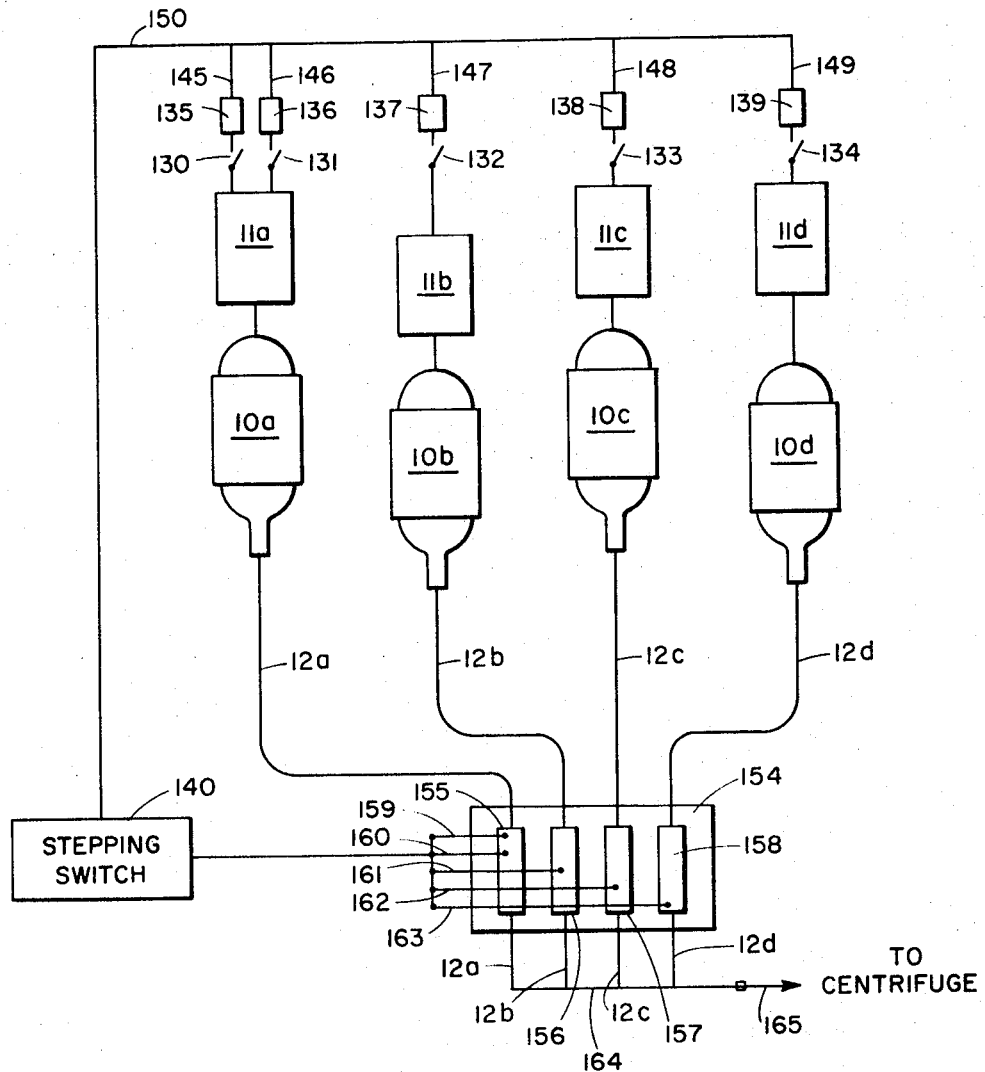
FIG. 12 is a diagrammatic representation of the liquid dispensing program system of this invention incorporating a plurality of liquid reservoirs.

FIG. 12 illustrates, somewhat diagrammatically, the incorporation of a plurality of the liquid dispensing assemblies of FIGS. 1 and 2 incorporated into a total system. A series of liquid reservoirs 10a-10d provide the various liquids to be used, and each reservoir has a weight sensing mechanism 11a-11d (such as shown in FIGS. 1-5) associated with it. If the reservoirs are flexible plastic bags such as shown in FIGS. 10 and 11, then they may be hung using springs such as in FIG. 10 or they may be equipped with the pneumatic pressurizing device of FIG. 11. The liquids from reservoirs 10a-10d flow through respective flexible tubings 12a-12d to a flow control system 154 which may consist of a series of liquid flow control means such as pumps or automatic pinch clamps (designated 155-158) as shown in FIGS. 6-8 or of any other suitable mechanism for controlling the flow of liquids through the tubings.

The tubings 12a-12d extend through the pumps or pinch clamps and may terminate in a manifold 164 which is coupled to or integral with tubing 165 leading to the inlet line of a centrifuge, or to some other delivery point. The flexible tubings may conveniently be mounted in a harness such as shown in FIG. 8 of U.S. Pat. No. 3,565,286 if a series of roller pumps is used.

Figure 13:
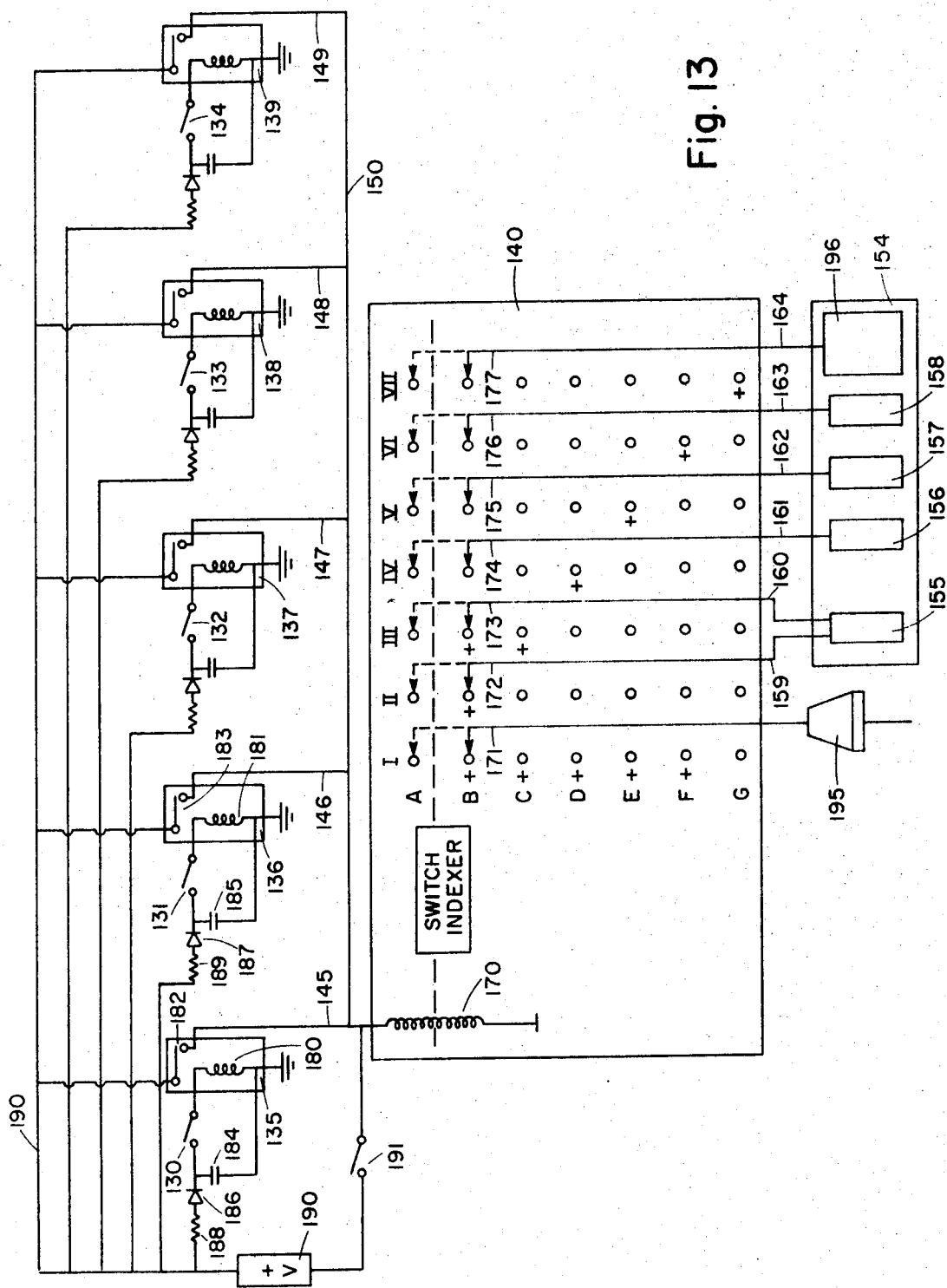
FIG. 13 is a detailed circuit diagram incorporating a stepping switch.

In FIG. 12 each of the sensing devices 11a-11d (constructed as shown in FIGS. 1-5) is depicted diagrammatically with its weight sensing switch or switches shown separately for ease of identification. As explained previously, these switches may be of any suitable type such as those illustrated in FIGS. 1-5. It is assumed for the sake of illustration that weight sensing device 11a is constructed with two switches in series as in FIG. 3 and that the first of these two switches is used to change the liquid flow rate during the delivery of liquid from reservoir 10a using the mechanism illustrated in FIG. 8. Therefore two switches 130 and 131 are shown for weight sensing device 11a and switches 132, 133 and 134 for weight sensing devices 11b, 11c and 11d, respectively. Associated with each of these switches is a relay, these relays being numbered 135-139, respectively. Since each switch remains closed once the desired weight loss experienced by each reservoir is sensed, it is necessary to use circuitry between the switches 130-134 and a stepping switch 140 which takes this factor into account. An example of such circuitry will be described in detail with reference to FIG. 13. Each weight sensing device is connected through its associated switch or switches and relay or relays through connecting leads, e.g., leads 145-149, respectively, and a common connection means 150 to stepping switch 140. The stepping switch is wired as shown in FIG. 13 so that when the protocol is begun by initial actuation of the stepping switch, the liquid flow control means 155-158 are actuated in proper sequence. To begin, the liquid flow mechanism 155 (e.g., the automated pinch clamp system of FIG. 8) associated with tubing 12a connected to reservoir 10a is started. Liquid is then withdrawn from container 10a through liquid flow control means 155 (connected through leads 159 and 160 to stepping switch 140) and delivered to a centrifuge (or other point of delivery) by way of manifold 164 and conduit 165. The rate of liquid flow is altered (increased or decreased) with the closing of switch 130 and stopped with the closing of switch 131 by the indexing of the stepping switch to the next step, at which time the fluid flow control mechanism 156 associated with reservoir 10b is actuated. Fluid flow mechanism 156 is connected to stepping switch 140 through leads 161, and fluid flow mechanisms 157 and 158 through leads 162 and 163. Any or all of the weight sensing mechanisms may, of course have multiple weight sensing switches as shown for 11a, in which case additional steps on the stepping switch would be used. The procedure described in continued until the desired predetermined quantity of liquid is withdrawn from each of the liquid reservoirs.

As noted above, the stepping switch may be wired to include procedural steps other than the delivery of liquids in a protocol. In the case of the treatment of red blood cells, the stepping switch may be wired to stop the centrifuge and initiate pump-out of the deglycerolized red cells as illustrated in FIG. 13.

FIG. 13 illustrates one possible combination of circuitry embodying the weight sensing switches, stepping switch and fluid flow control mechanisms. Indentical reference numbers are used to refer to identical components in FIGS. 12 and 13. Inasmuch as the circuitry associated with each weight sensing switch is identical, it will be described only for switches 130 and 131. Because once the weight sensing switches 130 and 131 are closed they remain closed throughout the entire protocol, circuitry must be provide to provide only a momentary signal to the stepping coil 170 of the stepping switch 140. This stepping coil in turn operates a switch indexer mechanically or otherwise linked to the stepping mechanism, illustrated as contact fingers 171–177, as it advances to make the necessary contacts with the contact points illustrated by the bank of small circles. The circuitry of FIG. 13 associated with reservoir 10a which provides the momentary signal to stepping coil 170 for liquid flow control from reservoir 10a comprises the weight sensing switches 130 and 131 and relays 135 and 136. Relay 135 is comprised of a coil 180 and a normally open relay switch 182, a capacitor 184, a diode 186 and a resistor 188. Likewise, relay 136 comprises coil 181, switch 183, capacitor 185, diode 187 and resistor 189. The resistors and capacitors are selected so that sufficient voltage will be supplied from source 190 to momentarily close relay switches 182 and 183 when weight sensing switches 130 and 131 are closed, thus supplying power via lines 190, 145 (or 146) and 150 to stepping coil 170. However, with the discharge of capacitor 184, relay switch 182 opens and the stepping switch is in the position illustrated in FIG. 13, having been indexed from the previous position (indicated by the dotted lines used to show position of the contact points 171–177) before the protocol is begun. Movement of the stepping switch at the beginning of the protocol is accomplished by hand actuation of the normally open, momentary control push button switch 191. This hand actuation of switch 191 is the only action required on the part of the operator of the apparatus of this invention.

It will be seen in FIG. 13 that with the starting of the protocol the contact fingers are automatically indexed to bank B of the contact points and that the stepping switch 140 is so wired that the contact points in tiers I, II and III are connected to a suitable power source indicated by the +'s. Thus the centrifuge 195 is started, automated pinch clamp 96 (FIG. 8) is open and automated pinch clamp 95 (FIG. 8) is in the desired position to give the predetermined flow rate. When a predetermined amount of liquid is withdrawn from liquid reservoir 10a at the first flow rate, switch 130 is closed (e.g., magnet 34 activates reed switch 60 of FIG. 3) which momentarily closed relay switch 182 to activate stepping coil 170 and move the stepping switch indexer to bank C. It will be seen that the centrifuge remains on and liquid continues to flow in tubing 10a at a new rate determined by the movement of automated clamp 95. Then when switch 131 is closed (e.g., magnet 34 actuates reed switch 53 of FIG. 3) relay switch 183 is momentarily closed, the switch indexer indexes the stepping switch contact fingers to bank D where the fluid flow mechanism 156 associated with tubing 12b and reservoir 10b is actuated until switch 132 is closed. This procedure is repeated for switches 133 and 134, which are connected in identical circuitry, to deliver liquid sequentially from reservoirs 10c and 10d. The centrifuge of course remains on until all the liquid is delivered from reservoir 10d as the stepping switch is indexed through bank F. Finally, the centrifuge is stopped and when the stepping switch is indexed to bank G, a cell pump-out mechanism 196 is actuated. When the operation of this mechanism is complete, the switch may be indexed further to return it to bank A in position to begin another protocol.

The method and apparatus of this invention provide a simple, but accurate, system for programming the dispensing of one or more liquids at predetermined and controlled rates of flow. The system does not demand a highly trained technician for operation and it requires only a resetting of the line pointer on the scales to preset new quantities of liquids. The system is particularly useful for delivering liquids to a centrifuge designed to deglycerolize red blood cells.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

I claim:

1. A programmed liquid delivery system capable of delivering predetermined quantities of liquids in sequence according to a predetermined protocol, comprising in combination
   a. a plurality of liquid reservoir means each containing a liquid, each of said reservoir means including discharge means and being adapted for free suspension;
   b. separate tubing means connected to each of said discharge means of said liquid reservoir means;
   c. separate weighing means associated with each of said reservoir means and arranged to effect the free suspension of said reservoir means and to be responsive to a decrease in weight of said associated reservoir means as said liquid is withdrawn therefrom, said decrease in weight being a measure of the quantity of said liquid withdrawn from said associated reservoir means;
   d. separate sensing means, actuatable by each of said weighing means, adapted to sense the withdrawal of at least one in a series of predetermined quantities of said liquid from its associated reservoir means and to generate a switching signal when each predetermined quantity has been withdrawn;
   e. stepping switch means adapted to receive said switching signals in sequence from said separate sensing means and to generate fluid flow control signals; and
   f. separate fluid flow rate control means associated with each of said tubing means and responsive to said fluid flow control signals, whereby the flow of said liquid in each of said tubing means is directly controlled by the quantity of said liquid withdrawn from said associated liquid reservoir means.

2. A programmed liquid delivery system in accordance with claim 1 including liquid manifold means connected to each of said tubing means.

3. A programmed liquid delivery system in accordance with claim 1 wherein each of said weighing means comprises a tension spring, the upper end of which is anchored to fixed support means and the lower end of which is anchored to a freely moving vertically oriented rod arranged to effect said free suspension of said reservoir means.

4. A programmed liquid delivery system in accordance with claim 1 wherein each of said sensing means comprises switch means positionable at predetermined positions along the length of said spring and switch actuating means affixed to said rod.

5. A programmed liquid delivery system in accordance with claim 4 wherein said switch means comprises a reed switch and said switch actuating means comprises a magnet.

6. A programmed liquid delivery system in accordance with claim 1 wherein each of said fluid flow rate control means comprises separate roller pump means arranged to effect compression and decompression of said tubing means.

7. A programmed liquid delivery system in accordance with claim 1 wherein each of said fluid flow rate control means comprises pinch clamp means.

8. A programmed liquid delivery system in accordance with claim 7 wherein one or more of said pinch clamp means comprises first overcenter pivot arm means and associated adjustable platen means adapted to control the cross sectional area of said tubing means and thereby to control the rate of fluid flow through said tubing means and second overcenter pivot arm means and associated fixed platen means adapted to open and close said tubing means to liquid flow.

9. A programmed liquid delivery system capable of delivering a predetermined quantity of a liquid, comprising in combination
   a. a plurality of liquid reservoir means each containing a liquid, each of said reservoir means including discharge means and being adapted for free suspension;
   b. separate tubing means connected to each of said discharge means of said liquid reservoir means;
   c. separate liquid weight measuring means associated with each of said liquid reservoir means, each of said liquid reservoir means, each of said liquid weight measuring means comprising in combination
   1. frame means including an upper horizontal support member,
   2. a vertically oriented rod freely movable within said frame means, said rod having attachment means on its lower end adapted to effect the free suspension of said liquid reservoir means,
   3. a tension spring affixed to said support member and to said rod, said tension spring being adapted to support and surround said rod and being responsive to the weight of said liquid reservoir means suspended by said rod;
   4. pointer means affixed to said rod,
   5. weight sensing switch actuator means affixed to said rod,
   6. calibrated scale means parallel to said rod, spaced therefrom and slotted to permit said pointer means to move freely along the face of said scale means to indicate positions thereon indicative of the weight of said liquid reservoir means,
   7. movable scale support means, and
   8. weight sensing switch means, affixed to said scale support means, adapted for actuation by said weight sensing switch actuator means when said weight sensing switch actuator means is moved into actuating position by the upward movement of said rod, the actuation of each of said weight sensing switch means giving rise to an electrical signal when at least one in a series of predetermined quantities of said liquid has been withdrawn from each of said reservoir means;
   d. separate fluid flow rate control means associated with each of said tubing means;
   e. stepping switch means responsive to said electrical signals and adapted to control in sequence each of said fluid flow rate control means whereby the flow of said liquid in each of said tubing means is controlled by the quantity of said liquid withdrawn from said liquid reservoir means connected thereto.

10. A programmed liquid delivery system in accordance with claim 9 wherein one or more of said liquid weight measuring means has a plurality of said weight sensing switch means actuatable in sequence by said weight sensing switch actuator means, the actuation of each of said weight sensing switch means giving rise to a separate electrical signal; and wherein said fluid flow control means associated with the tubing means connected to the liquid reservoir means with which said liquid weight measuring means is associated comprises separate pinch clamp means for each of said weight sensing switching means whereby the rate of fluid flow in said tubing may be varied according to a predetermined protocol.

* * * * *